United States Patent [19]

Golan

[11] 4,336,827
[45] Jun. 29, 1982

[54] VALVE ACTUATOR WITH HYDRAULIC LATCHING

[75] Inventor: Kenneth F. Golan, Pekin, Ill.

[73] Assignee: Caterpillar Tractor Co., Peoria, Ill.

[21] Appl. No.: 261,096

[22] PCT Filed: Oct. 17, 1980

[86] PCT No.: PCT/US80/01399
§ 371 Date: Oct. 17, 1980
§ 102(e) Date: Oct. 17, 1980

[87] PCT Pub. No.: WO82/01401
PCT Pub. Date: Apr. 29, 1982

[51] Int. Cl.³ .................................. F16K 11/07
[52] U.S. Cl. .................. 137/624.27; 137/625.69
[58] Field of Search ............ 137/624.27, 625.69, 137/625.68; 91/36

[56] References Cited

U.S. PATENT DOCUMENTS

| | | | |
|---|---|---|---|
| 2,689,585 | 9/1954 | Presnell | 137/624.27 |
| 2,837,117 | 6/1955 | Ruhl | 137/624.27 |
| 2,864,402 | 12/1958 | Presnell | 137/624.27 |
| 2,874,720 | 2/1959 | Vahs | |
| 3,247,768 | 4/1966 | Tennis | |
| 3,511,276 | 5/1970 | Jessen | 137/624.27 |
| 3,568,717 | 3/1971 | Plate | 137/624.27 |
| 3,790,125 | 2/1974 | Swatty | |
| 3,866,880 | 2/1975 | Schexnayder | 137/624.27 X |

Primary Examiner—Alan Cohan
Attorney, Agent, or Firm—J. W. Burrows

[57] ABSTRACT

A hydraulic latching valve mechanism (48) is provided integral with a control valve (14) to hydraulically hold an actuator (47) in an engaged position (E). This eliminates the need for mechanical detents and/or extra external lines. The valve mechanism (48) has first and second members (58, 66) which cooperate to selectively communicate a fluid chamber (59) with an exhaust port (52) or an inlet port (26) in response to the actuator (47) being moved from a first position (D) to the second position (E). This arrangement is used to maintain a valve spool (30) in a second position for extended periods of time by using the system pressure as the holding force.

6 Claims, 1 Drawing Figure

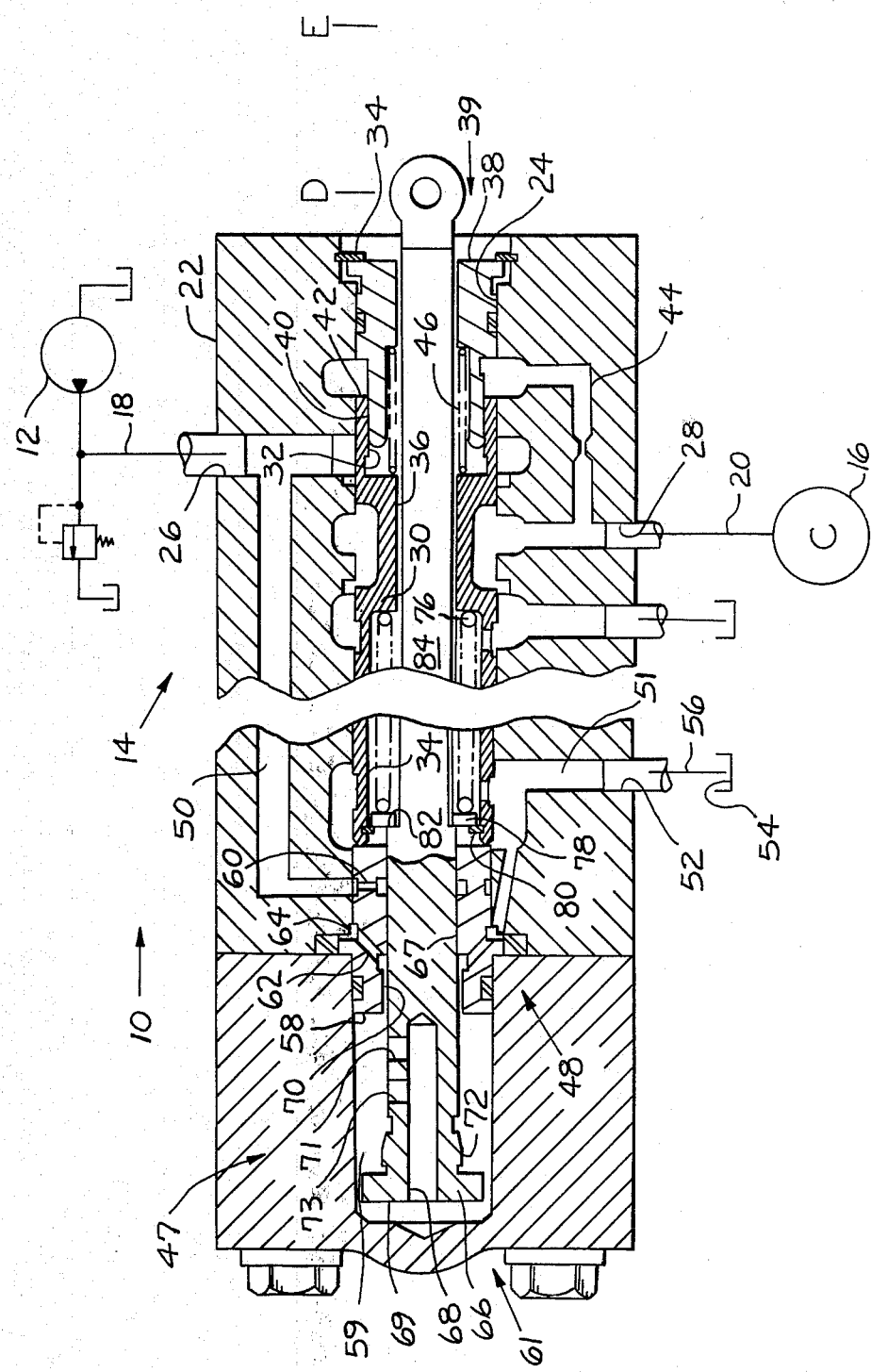

VALVE ACTUATOR WITH HYDRAULIC LATCHING

DESCRIPTION

1. Technical Field

This invention relates generally to a valve for use in a hydraulic system and more particularly to a latching mechanism that is integral with the valve for hydraulically holding a spool in the actuated position.

2. Background Art

Some valves use detents that act against the spool and are hydraulically held in position by the system pressure. Others use a plunger that responds to system pressure to act against a series of ball detents to hold the spool in an actuated position. These all require several additional pieces to perform their function plus require various external lines to route system pressure. Still other valves also use detents that are engaged manually by shifting the spool and released in response to a pressure reaching a predetermined level or the work piece reaching a predetermined position. These likewise require external lines to initiate operation.

The present invention is directed to overcoming one or more of the problems as set forth above.

DISCLOSURE OF THE INVENTION

In one aspect of the present invention, a valve has a housing with a bore and an inlet and outlet port in communication with the bore. A spool is slideably disposed in the bore and moveable between a first position at which the inlet port is blocked from the outlet port and a second position at which the inlet port is in communication with the outlet port. An actuation means controls movement of the spool between the first and second positions. A valve means hydraulically latches the actuation means at the second position in response to the actuation means being moved to the second position. The valve means is integral with the actuation means.

BRIEF DESCRIPTION OF THE DRAWINGS

The FIGURE is a cross-sectional view of a valve encompassing an embodiment of the present invention.

Best Mode for Carrying Out the Invention

Referring now to the FIGURE, a fluid system is generally indicated by reference numeral 10 and includes a pump 12, a valve 14, and a fluid unit, such as a clutch 16, each respectfully interconnected to the valve 14 through conduits 18,20. The pump is driven by an engine, not shown, while the clutch 16 is used, for example to engage a power take off (PTO) on a tractor, not shown.

The control valve 14 includes a housing 22 defining a bore 24. An inlet port 26 is connected to conduit 18 and communicates with bore 24. An outlet port 28 is connected to conduit 20 and communicates with the bore 24.

A spool 30 is slideably disposed in bore 24 and has a first bore 32 at one end portion of the spool and a second bore 34 on the other end portion of the spool. The first and second bores 32,34 are connected by a third through bore 36. The spool 30 is moveable between a first position at which the inlet port 26 is blocked from communication with the outlet port 28 and a second position at which the inlet port 26 is in communication with the outlet port 28.

A plug 38 is positioned in one end 39 of the bore 24 of the housing 22 and is secured by a snap ring 34. The plug 38 has an annular end portion 40 which slideably and sealingly receives the first bore 32 of spool 30 to produce a pressure responsive surface 42. Pressure responsive surface 42 is in communication with outlet port 28 through a feedback passage 44 to provide a feedback signal to spool 30. A spring 46 is positioned between plug 38 and spool 30 to bias spool 30 to the first position, as shown. An actuation means 47 controllably moves the spool 30 between the first and second positions.

A valve means 48 for hydraulically latching the actuation means 47 at the second position in response to the actuation means 47 being moved to the second position is axially positioned in the bore 24 relative to the spool 30. A passage 50 communicates inlet port 26 with the valve means 48 and an exhaust passage 51 communicates an exhaust port 52 with the valve means 48. The exhaust port 52 is connected to a tank 54 through a conduit 56. Valve means 48 includes a first member 58 secured in the bore 24 and defines a fluid chamber 59 at another end 61 of the bore 24. The first member 58 has a first port 60 in communication with the inlet port 26 through passage 50. A second port 62 in the first member 58 is in communication with the exhaust port 52 through an annulus 64 and exhaust passage 51. The valve means 48 further includes a second member 66 slideably positioned in a bore 67 of the first member 58. The second member 66 includes a control passage 68 which is in fluid communication with the fluid chamber 59 on an end 69 of the second member 66 and in communication with the periphery of the second member 66 through a pair of radial ports 71,73. The second member 66 is moveable between a first position "D", as shown, at which the fluid chamber 59 is in communication with the second port 62 of the first member 58 and blocked from communication with the first port 60 of the first member 58 and a second position "E" at which the fluid chamber 59 is in communication with the first port 60 and blocked from communication with the second port 62. The first member 58 has a stepped bore 70 at one end to sealingly receive an enlarged land 72 of the second member 66.

The actuation means 47 includes the second member 66 and a spring 76 positioned in the second bore 34 of the spool 30 and retained therein by a spacer 78 and a snap ring 80. The spacer 78 abuts a shoulder 82 of the second member 66. The second member 66 also has an extension 84 extending outside the housing through the third bore 36 of spool 30.

INDUSTRIAL APPLICABILITY

The present invention has particular utility on hydraulic systems having valves that are to be actuated and held in the actuated condition for extended periods of time.

The operator moves the valve by moving associated linkage (not shown) connected to the extension 84 of second member 66 moving the second member 66 to the right as shown in the FIGURE. Shoulder 82 of the second member 66 acts through spacer 78 and spring 76 to move spool 30 to its second position directing fluid pressure to the clutch 16 for engagement thereof.

Once the second member 66 is moved to the second position "E", fluid pressure from inlet port 26 is directed through passage 50, first port 60, first radial port 71 and control passage 68 to fluid chamber 59. The second port 62 and exhaust passage 51 are blocked from communication with fluid chamber 59 by land 72 sealingly engaging stepped bore 70 of the first member 58 and second radial port 73 being closed off by the bore 67. The fluid pressure in the fluid chamber 59 acts on an effective area of the second member to hold the second member in the second position "E" and the second member maintains the spool 30 in the second position.

Upon initial movement of the second member 66 away from the second position, "E", first radial port 71 is moved away from communication with first port 60 of first member 58 and simultaneously therewith second radial port 73 moves into communication with the second port 62 of first member 58 through stepped bore 70. During the initial movement of second member 66, the enlarged land 72 remains in sealing engagement with stepped bore 70. As the second radial port 73 opens to second port 62, the fluid chamber 59 is vented to tank 54 through control passage 68, second radial port 73, stepped bore 70, second port 62, annulus 64, exhaust passage 51 and conduit 56 allowing the second member 66 to move to the first position "D" under the bias of springs 46 and 76.

The second member 66 will automatically move from the latched, second position "E" to the first position "D" once the engine is shut off. By shutting off the engine, the pump 12 does not supply pressurized fluid; consequently, the fluid pressure in the system will quickly leak down through the pump 12 and across the lands of the spool. Once the pressure in fluid chamber 59 drops to a predetermined level, the second member 66 and hence the spool 30 moves from the second position to the first position under the influence of springs 46 and 76.

By providing the valve means 48 integral with the actuation means 47 and located in the same housing 22 with the valve spool 30, it is possible to eliminate various detent components and other external lines.

Other aspects, objects and advantages of this invention can be obtained from a study of the drawing, the disclosure and the appended claims.

I claim:

1. In a valve (14) having a housing (22), a bore (24) in the housing (22), an inlet and outlet port (26,28) in communication with the bore (24), a spool (30) slideably disposed in said bore (24) and moveable between a first position (D) at which said inlet port (26) is blocked from said outlet port (28) and a second position (E) at which said inlet port (26) is in communication with said outlet port (28), actuation means for controllably moving said spool (30) between said first and second positions (D,E), the improvement comprising:

pressure responsive means including valve means (48) for hydraulically latching said actuation means at said second position (E) in response to said actuation means being moved to said second position (E), said valve means (48) being integral with said actuation means.

2. The valve (14), as set forth in claim 2, wherein said valve means (48) is in direct communication with said inlet port (26) and axially positioned in said bore (24) relative to said spool (30).

3. The valve (14), as set forth in claim 2, wherein said housing (22) has an exhaust port (52) in communication with said valve means (48).

4. The valve (14), as set forth in claim 3, wherein said valve means (48) includes first and second members (58,66), said first member (58) having a first port (60) in communication with said inlet port (26) and a second port (62) in communication with said exhaust port (52), said first member (58) defining a fluid chamber (59) at one end (39) of said first member (58), and said second member (66) being slideably positioned in said first member (58) and having a control passage (68) in communication with the fluid chamber (59), said second member (66) being moveable between a first position (D) at which said fluid chamber (59) is in communication with said second port (62) of said first member (58) and blocked from communication with said first port (60) of said first member (58) and a second position (E) at which said fluid chamber (59) is in communication with said first port (60) and blocked from communication with said second port (62).

5. The valve (14), as set forth in claim 4, wherein said actuation means includes the second member (66) of the valve means (48) and a spring (76) positioned between said spool (30) and said second member (66).

6. The valve (14), as set forth in claim 4, wherein said spool (30) has a through bore (36) and said second member (66) has an extension (84) extending through said through bore (36) in said spool (30) and ending outside said housing (22).

* * * * *